July 21, 1953   L. W. BEDKER   2,645,980
BROACH FOR SHAVING ROUND PARTS
Filed Dec. 29, 1948
FIG.1.
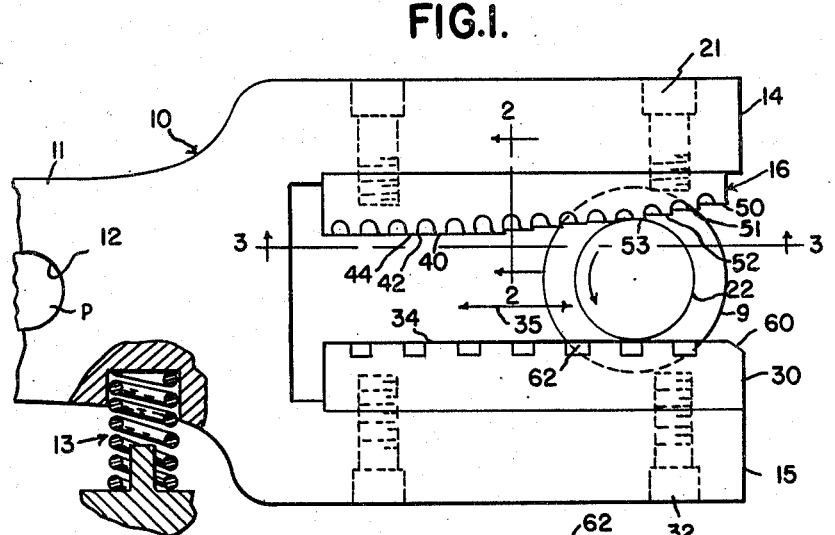
FIG.5.
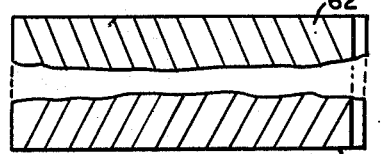
FIG.2.
FIG.4.
FIG.3.
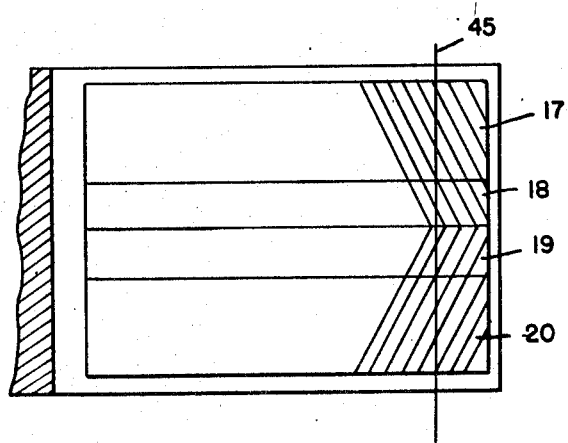
INVENTOR.
LEO W. BEDKER
BY Whittemore
Hulbert & Belknap
ATTORNEYS Patented July 21, 1953

2,645,980

UNITED STATES PATENT OFFICE 2,645,980

BROACH FOR SHAVING ROUND PARTS

Leo W. Bedker, East Detroit, Mich., assignor of one-half to Emma G. Bedker, East Detroit, Mich.

Application December 29, 1948, Serial No. 67,995

7 Claims. (Cl. 90—33)

The present invention relates to apparatus for broach shaving parts of circular cross section and more particularly to apparatus designed to afford support to a part while turning it to desired dimension.

It is an object of the present invention to provide a cutting tool for broach shaving a circular work piece to finish dimensions while supporting the work piece against lateral displacement.

It is a further object of the present invention to provide means for broach shaving an imperfectly supported part to a high degree of accuracy.

It is a feature of the present invention to provide a broach shaving tool comprising a broach with inclined, stepped teeth in combination with a smooth gauging surface for holding a rotary work piece against the broach.

Other objects and features of the invention will become apparent as the description proceeds, especially when considered in conjunction with the accompanying drawings, wherein:

Figure 1 is a side elevation, partly in section, of a tool embodying the present invention;

Figure 2 is a fragmentary section on the line 2—2, Figure 1;

Figure 3 is a section on the line 3—3, Figure 1;

Figure 4 is a perspective view of the part being shaved; and

Figure 5 is a plan view, partly broken away of the gauge block.

While capable of use in many different types of machines, the present tool has been designed primarily for use in an automatic screw machine. In machines of this type, bar or rod stock is advanced through a gripping and rotary driving chuck a portion of which is seen at 9 in Figure 1, which supports a projecting end of the stock for a plurality of different operations. Since the part of the stock being worked on is supported only at one end, and since the stock may be of relatively small diameter, difficulty has been encountered in obtaining a desirable surface finish and accurate finish dimensions.

In order to overcome these objections, a holder 10 is provided in the form of a yoke having a shank 11 provided with an opening 12 by means of which the holder is pivotally mounted. The screw machine includes a pin P movable toward and away from the axis of the chuck, which engages in opening 12 and supports the holder for pivotal movement as well as moving the holder radially of the axis of the chuck. Spring means indicated generally at 13 are provided to bias the holder upwardly about the axis of the opening 12. The holder comprises a pair of spaced parallel arms 14 and 15.

Secured to the inner surface of the arm 14 is a broach assembly indicated generally at 16. The broach assembly is made up of a plurality of sections, here illustrated as the four sections 17, 18, 19 and 20. The sections are retained rigidly in position by any suitable means, such as the machine screws indicated at 21.

The number, shape and arrangement of sections will of course depend upon the shape of the work piece or part to be finished.

In the illustrated embodiment the part 22 to be finished comprises a pair of reduced cylindrical sections 23 and 25, and an intermediate cylindrical section 27 of larger diameter, having radial end surfaces 29. Broach sections 18 and 19 finish shave the cylindrical surface of part section 27, while broach sections 17 and 20 finish shave the cylindrical surfaces of part sections 23 and 25, and preferably also the radial surfaces 29.

In order to assist in supporting the work piece, a smooth gauge block 30 is supported at the inner surface of yoke arm 15, and is secured thereto by suitable means such as the machine screws 32. The gauge surface 34 of the block 30 is composed of straight line elements parallel to the path of relative traverse between the part and the tool, this path being indicated by the arrow 35. In the event that the part has only curved surfaces, or inclined conical surfaces, the surface 34 will be shaped accordingly, but as illustrated it is a flat surface, which will bear against surface 27 of the part.

The teeth 40 of the broach sections are formed in a particular manner to cooperate with the gauge surface 34. Each tooth has a forward cutting edge 42 and an unrelieved top supporting surface 44. The top surfaces 44 of the teeth are composed of straight line elements parallel to the path of relative traverse between the tool and work piece, and in the illustrated embodiment, these surfaces are flat surfaces parallel to the gauge surface 34.

At least some of the teeth 40 of the broach are inclined to the path of traverse as seen in Figure 3, and are arranged such that the work piece 22 engages the tops of at least two teeth at points spaced widely along the axis of the work piece. In Figure 3, an instantaneous position of the axis of the work piece is indicated at 45, and it will be noted that in the position shown, the work piece will have instantaneous engagement with three teeth of each broach section 17 and 20. In practice the angularity of the teeth of sections 17 and 20 could be reduced such that the work piece would engage only a single tooth of each section under minimum supporting conditions, but preferably it will never engage less than two teeth of each end section.

Since the work piece is a part of small diameter, the area of contact between the work piece and tooth top is very small. It is not sufficiently large to burn the tooth, but it provides adequate support for the work piece and cooperates with the gauge surface 34 to produce extremely high accuracy in the finished part.

The broach teeth are inclined outwardly of the holder to facilitate chip disposal, but it is contemplated that the cutting operation will be carried out in a stream of oil, and since the chips provided are in reality fine shavings, they will be carried away in the oil without difficulty. In fact, it is not essential that all teeth be inclined, and in practice excellent results have been obtained when the broach sections 18 and 19 have been replaced with a single section having teeth perpendicular to the direction of relative traverse. It is, however, essential that sufficient teeth be inclined to give a continuous carryover in supporting the work piece, and preferably a carryover in support adjacent both ends of the portions of the work piece in the cutting zone.

In some cases it may be desirable to modify the inner ends of the teeth of broach sections 17 and 20 to provide a stepped cutting action on radial surfaces 29. Thus the teeth on these sections may be stepped to effect successive cuts on both the cylindrical surfaces 23 and 25 and radial surfaces 29, or they may be stepped to provide first successive cuts to depth on cylindrical surfaces 23 and 25, followed by successive cuts to depth on the radial surface 29.

As a safety precaution, the first tooth 50 of the broach section is relatively short and is intended to operate as a roughing tooth in the event that the rough cut part is oversize. The next few teeth, as 51, 52, 53, are stepped progressively higher to take successively finer cuts. The remaining teeth may be slightly higher than the tooth 52, and may if desired be of uniform height, or may be slightly stepped to take a series of very fine cuts. In any case, the last few teeth are of uniform height and will finish the part to substantially exact dimensions. As the first tooth of this last finishing section becomes worn, succeeding teeth take up the cut, so that no variation in size results from wear. Upon regrinding, finish dimension will of course be determined by the spacing between gauge surface 34 and the unrelieved top surfaces 44 of the final finishing teeth. Gauge block 30 is preferably adjustable, as by shims, for setting the tool to machine to exact dimension.

The resilient means 13 insures that gauge surface 34 always engages the part, so that accurate control of final dimension depends solely upon the spacing between gauge surface 34 and teeth 40, rather than upon accurate correlation between a work support and a tool support. The tool holder 10 may thus be regarded as a floating part which accommodates itself to the work piece while preserving accurate control over final dimension.

Since the tool holder floats and accommodates itself to the work, and since spring 13 urges the holder upwardly as seen in Figure 1, it is desirable that gauge block 30 extend beyond the broach assembly, and that its front corner be curved or inclined as shown at 60 to guide the holder onto the work piece.

While the gauge surface of the block 30 may be smooth, it is preferred to provide it with inclined grooves 62 for receiving chips and through which the chips may be washed outwardly by a flow of cutting compound. The inclination of the oil and chip groove may be in either direction, depending on the flow of oil and chip formations.

While the broach sections are illustrated as at the upper side of the yoke, it will be understood that this is because of the direction of rotation of the part, and if the direction of rotation were reversed, the holder would be inverted.

It is further pointed out that since the broach is located to take a conventional cut, as opposed to a climb cut, the surface of the work piece which engages the unrelieved top surface 44 of each tooth has been cut to proper dimension by the cutting edge of the tooth in front of the surface 44.

The drawings and the foregoing specification constitute a description of the improved broach for shaving round parts in such full, clear, concise and exact terms as to enable any person skilled in the art to practice the invention, the scope of which is indicated by the appended claims.

What I claim as my invention is:

1. A broaching attachment for use on an automatic screw machine effective to turn parts to circular cross-section comprising a holder having support means at one end for mounting said holder for rocking movement, said holder at its opposite end having spaced jaws, an elongated broaching tool carried at the inner side of one of said jaws having a series of progressively higher teeth inclined at an angle such as to insure simultaneous contact between at least two teeth and a rotating work piece, and a gauge block carried at the inner side of said other jaw, said gauge block having a gauging surface extending generally parallel to the length of said broaching tool.

2. An attachment as defined in claim 1 in which resilient means are provided operable on said holder to effect a rocking movement thereof in a direction to cause said gauge block to contact a work piece in advance of said tool.

3. An attachment as defined in claim 1 in which the tops of the broach teeth are unrelieved surfaces composed of straight line elements intersecting the cutting edges of said teeth and tangent to the surface of a work piece being cut.

4. An attachment as defined in claim 1 in which the tops of the broach teeth are flat, unrelieved surfaces.

5. An attachment as defined in claim 1 in which said gauge block is provided with a plane surface contacting the work piece, said plane surface being interrupted by a plurality of grooves providing channels for carrying away chips in the flow of oil normally provided for the turning operation.

6. In a screw machine comprising a work support for supporting bar stock with a free end thereof projecting beyond said support and for rotating said stock, a holder located at one side of the projecting end of the stock, means supporting said holder for rocking movement in a plane perpendicular to the axis of the stock, said holder comprising a pair of spaced jaws, an elongated broaching tool carried at the inner side of one of said jaws having a series of progressively higher teeth inclined at an angle such as to insure simultaneous contact between at least two teeth and a rotating work piece, and a gauge block carried at the inner side of said other jaw, said gauge block having a gauging surface extending generally parallel to the length of said broaching tool, means for advancing said holder radially of the stock to cause said jaws to pass on opposite sides of the stock, the means supporting said holder for rocking movement causing the holder to be guided by contact between the stock and said gauge block and broach.

7. Structure as defined in claim 6 comprising spring means connected to said holder in a direction to press said gauge block against the stock.

LEO W. BEDKER.

References Cited in the file of this patent

UNITED STATES PATENTS

| Number | Name | Date |
| --- | --- | --- |
| 1,448,321 | Weber | Mar. 13, 1923 |
| 2,039,480 | Floeter | May 5, 1936 |
| 2,154,739 | Floeter | Apr. 18, 1939 |
| 2,242,578 | Floeter | May 20, 1941 |

FOREIGN PATENTS

| Number | Country | Date |
| --- | --- | --- |
| 438,242 | Great Britain | Nov. 13, 1935 |